United States Patent [19]

Barry

[11] Patent Number: 5,452,200
[45] Date of Patent: Sep. 19, 1995

[54] CONTROL SYSTEM THAT SELECTS PROPORTIONAL-INTEGRAL CONTROL CHANNELS HAVING INTEGRATOR UPDATE CAPABILITY

[75] Inventor: William Barry, Jupiter, Fla.

[73] Assignee: United Technologies Corporation, Hartford, Conn.

[21] Appl. No.: 139,486

[22] Filed: Oct. 20, 1993

[51] Int. Cl.$^6$ ............................................. G05B 15/02
[52] U.S. Cl. .................................... 364/161; 364/133; 364/187
[58] Field of Search ............................ 364/131–135, 364/187; 371/8.1, 9.1.

[56] References Cited

U.S. PATENT DOCUMENTS

| 4,432,048 | 2/1984 | Ito et al. | 364/187 |
| 4,562,528 | 12/1985 | Baba | 364/133 |
| 4,587,470 | 5/1986 | Yamawaki | 364/162 |
| 4,600,870 | 7/1986 | Martin | 364/162 |
| 5,148,364 | 9/1992 | Scherer | 364/187 |
| 5,214,576 | 5/1993 | Tani et al. | 364/162 |
| 5,233,542 | 8/1993 | Hohner et al. | 364/187 |
| 5,233,543 | 8/1993 | Hoslund et al. | 364/187 |
| 5,245,531 | 9/1993 | Kuroiwa | 364/187 |
| 5,285,381 | 2/1994 | Iskarous et al. | 364/187 |

Primary Examiner—James P. Trammell
Attorney, Agent, or Firm—Robert E. Greenstien

[57] ABSTRACT

A control system has several proportion-integral channels, each producing a control signal based on an individual error signal and feedback of the control signal. One of the channels is selected to produce the control signal and that value for the control signal is used to recompute the error signal used by the other channel so that each channel produces the selected control signal. The recomputed error signal is then integrated. A different channel may be selected at a subsequent time and the integration in the other channels is recalculated in the same way.

3 Claims, 4 Drawing Sheets

CONTROL SYSTEM THAT SELECTS PROPORTIONAL-INTEGRAL CONTROL CHANNELS HAVING INTEGRATOR UPDATE CAPABILITY

The invention was made under a U.S. Government contract, and the U.S. Government has rights herein.

TECHNICAL FIELD

This invention relates to feedback control techniques, for example, those used in gas turbine engine fuel controls using a plurality of engine operating parameters to regulate fuel control as function of commanded engine power.

BACKGROUND OF THE INVENTION

The conventional gas turbine fuel control is complex electro-mechanical device that uses a number of engine operating conditions (parameters) to regulate fuel flow to the burner to achieve and maintain a commanded engine speed, such as fan speed N1. The fuel control, using feedback, responds to power lever setting (PLA) to match commanded power and fan speed. Among the engine operating parameters that the control typically uses are N1 and N2, respectively the speed of the low and high speed rotors. Other parameters include the temperature and pressure at the inlet and within the compressor stage and exhaust nozzle orientation, in the case of high performance engines employing variable pitch and area exhaust nozzles.

Depending on engine and flight conditions, such a command for peak acceleration from cruise, the control may select one parameter over another on which to "close the loop" for fuel flow to the engine. The transfer function for the control path for each parameter is a so-called proportional integral control, which provides good response and accuracy for aircraft engine applications. The basic transfer for fuel flow WF may be expressed as:

$$WF_t = K1 \cdot \int WF_{Return} + K2 \cdot \Delta \delta t \qquad (1)$$

where WFt is the total fuel flow at time t and error is the parameter feedback, such as the value of N1 (closing the loop on N1). Ideally, the output from each loop (for each engine operating parameter) produces the same scheduled fuel flow (WFR) at all times, and if that were true, selecting one loop over another would be invisible in the sense that there would be no immediate change in WFR at selection. This is not the case, however, because the parameters have different relationships to engine operation at any instant and thus one may command more or less WFR than another at any instant in time, creating a significant stability problem when selecting one channel over another. When selection is carried in this way, the loops can have significant divergence, producing erratic control.

DISCLOSURE OF THE INVENTION

Among the objects of the present invention is to provide a method for selecting between multiple proportional-integral control loops to control a common output to achieve unaltered loop dynamic response during loop transitions.

According to the invention, each loop's response characteristics is defined independently of the other loops by using the current output from the control to update the integrator in each loop. The output for each loop is calculated based on the current control output. The outputs of all the loops are compared to determine which loop should be selected to produce the control output, and once this is done the integrator for the other loops are updated or recalculated to produce the same result.

According to the invention, integrator recalculation includes calculating the error term for each loop that would have produced an output equal to the selected output and then integrating that error term. Integrator recalculation prevents "windup" of the loop integrator not selected.

A feature of the invention is that it provides smooth transfers between control loops without altering the dynamic response characteristics of the individual loops. The invention prevents the divergence and instability associated with conventional multi-channel control loop systems, especially those used in high performance aircraft gas turbine propulsion systems. Other objects, benefits and features of the invention will be apparent to one skilled in the art from the following drawings and the discussion that follows.

BEST MODE FOR CARRYING OUT THE INVENTION

Figure 1:
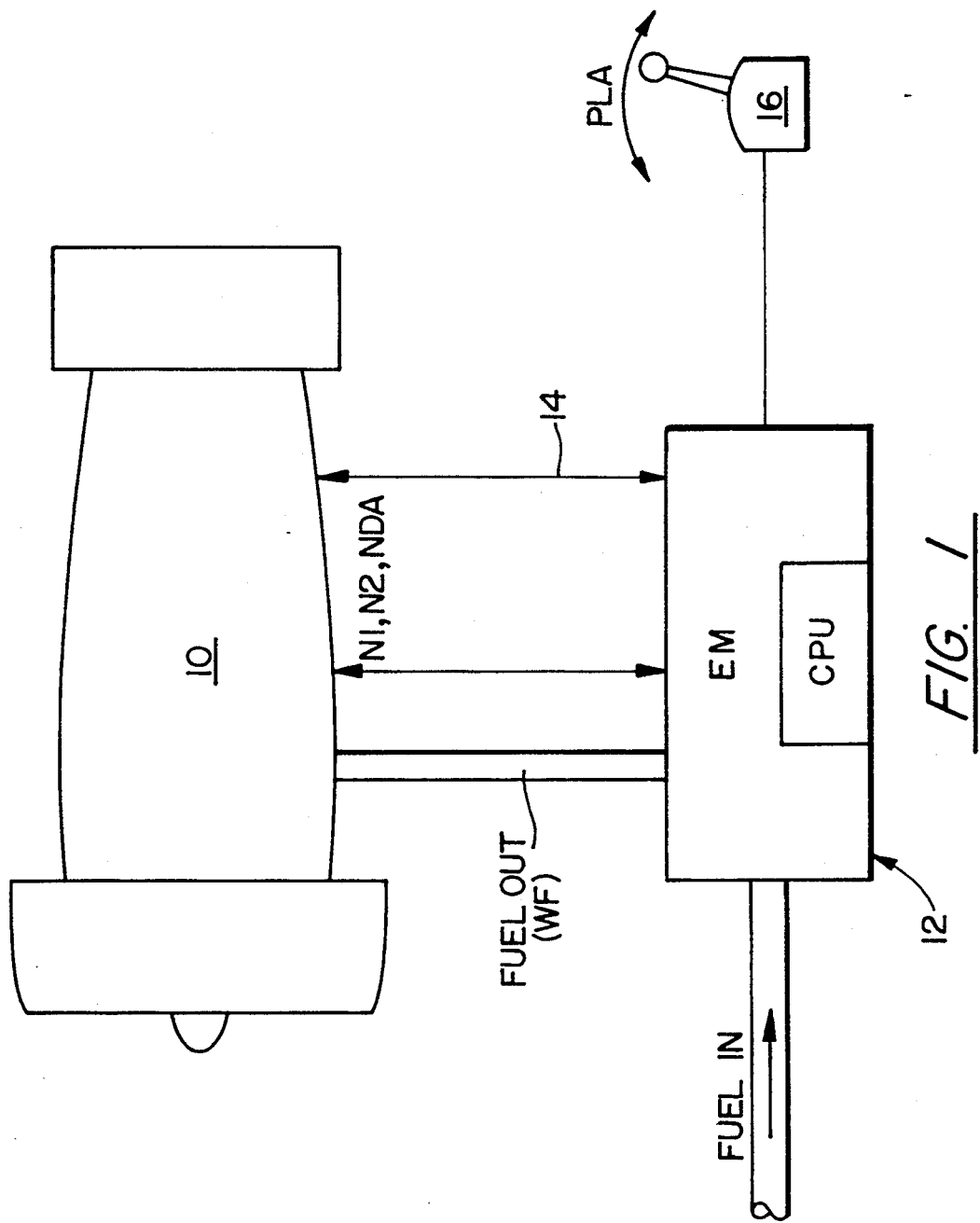
FIG. 1 is a simplified block diagram showing an aircraft jet engine control system with a computer based control that could employ the present invention.
Figure 3:
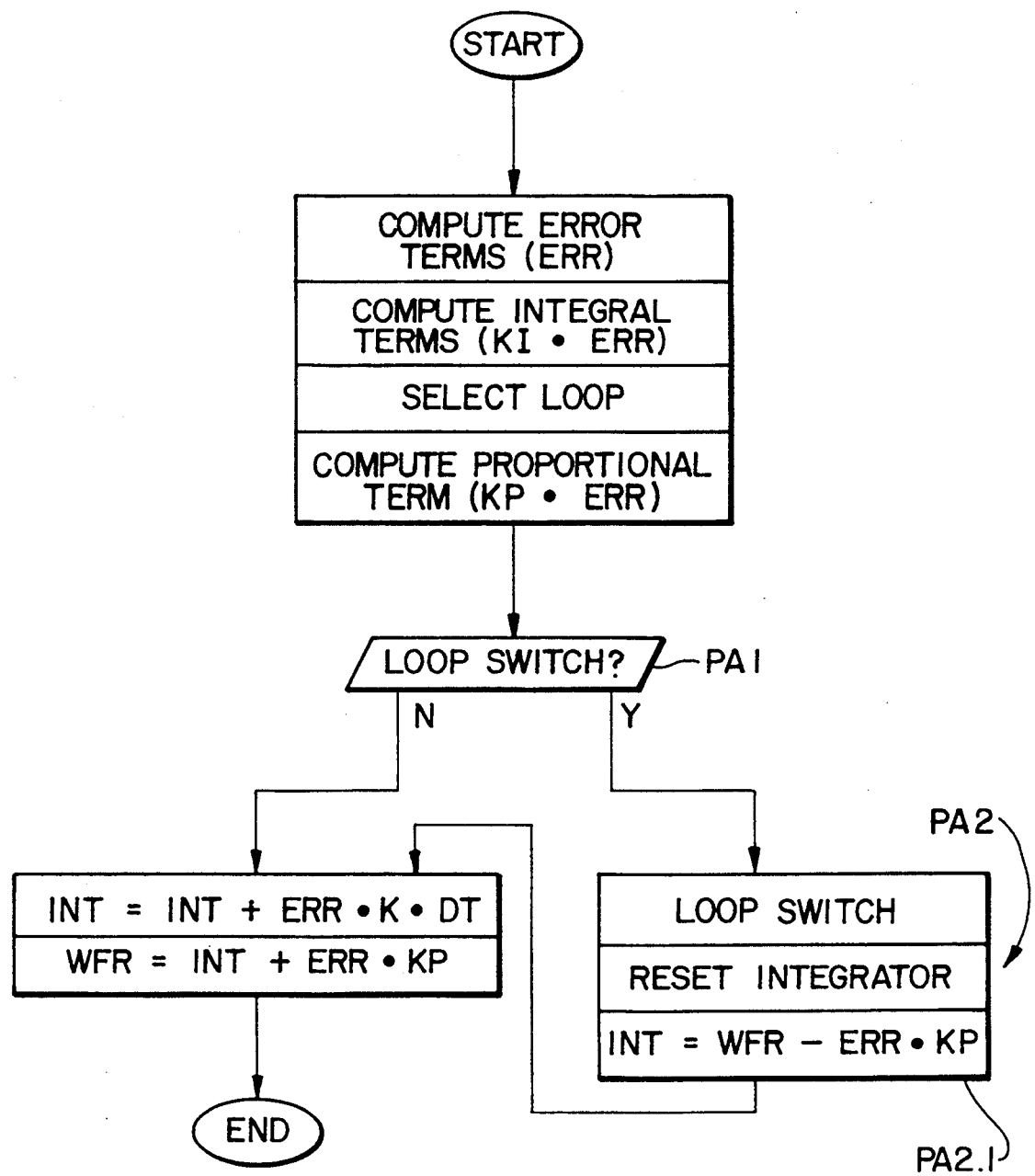
FIG. 3 is a flow chart showing illustrating the signal processing sequences that are carried out in a computer based control of the conventional type in the prior art for selecting one of a plurality of control loop channels.

In FIG. 1, a gas turbine engine is controlled by a digital fuel control 12 (often called "FADEC" for "full authority digital electronic control") containing a signal processor or central processing unit CPU that controls electromechanical elements, collectively EM that regulate fuel flow WF. The fuel control 12 is connected electrically to the engine 10 over a plurality of data lines (a bus) over which it receives data on various engine operating parameters, such as N1, N2 and NDA. The fuel control 12 responds to these signals and the position PLA of a power lever 16 that the pilot advances to command more engine power, for instance a particular N1, which correlates to engine thrust. The fuel control senses actual N1 and compares it with N1 computed for the PLA and produces a fuel flow WF to achieve that value of N1. The loop, however, may need to be closed on different parameters to achieve a particular type of engine performance. By way of example, assume that the control is running to N1 at idle power and the pilot snaps the throttle to intermediate power. The resultant fuel flow from the N1 loop for this action will violate the N2 acceleration limits. Therefore, the control of fuel flow must switch from controlling on N1 to controlling on N2 the acceleration rate. Through this selection the fuel flow must not change abruptly. In fact, as emphasized by the invention, when a selection is made, the instantaneous fuel flow associated with any selected parameter should match the instantaneous actual fuel flow; otherwise the feedback errors will cause the fuel flow to diverge from the correct value, especially when the control loop includes integration of a feedback value for actual fuel flow. In that regard, the prior art signal processing sequences in FIG. 3 should be noted. There, it will be seen that there is a test PA1 to determine if a loop switch or feedback parameter change should be made. An affirmative answer leads to the three steps PA2 in which the selected integrator is reset and then integration is started at PA2.1. A negative answer at step PA1, however, leads to normal integration, which would be expected.

Figure 2:
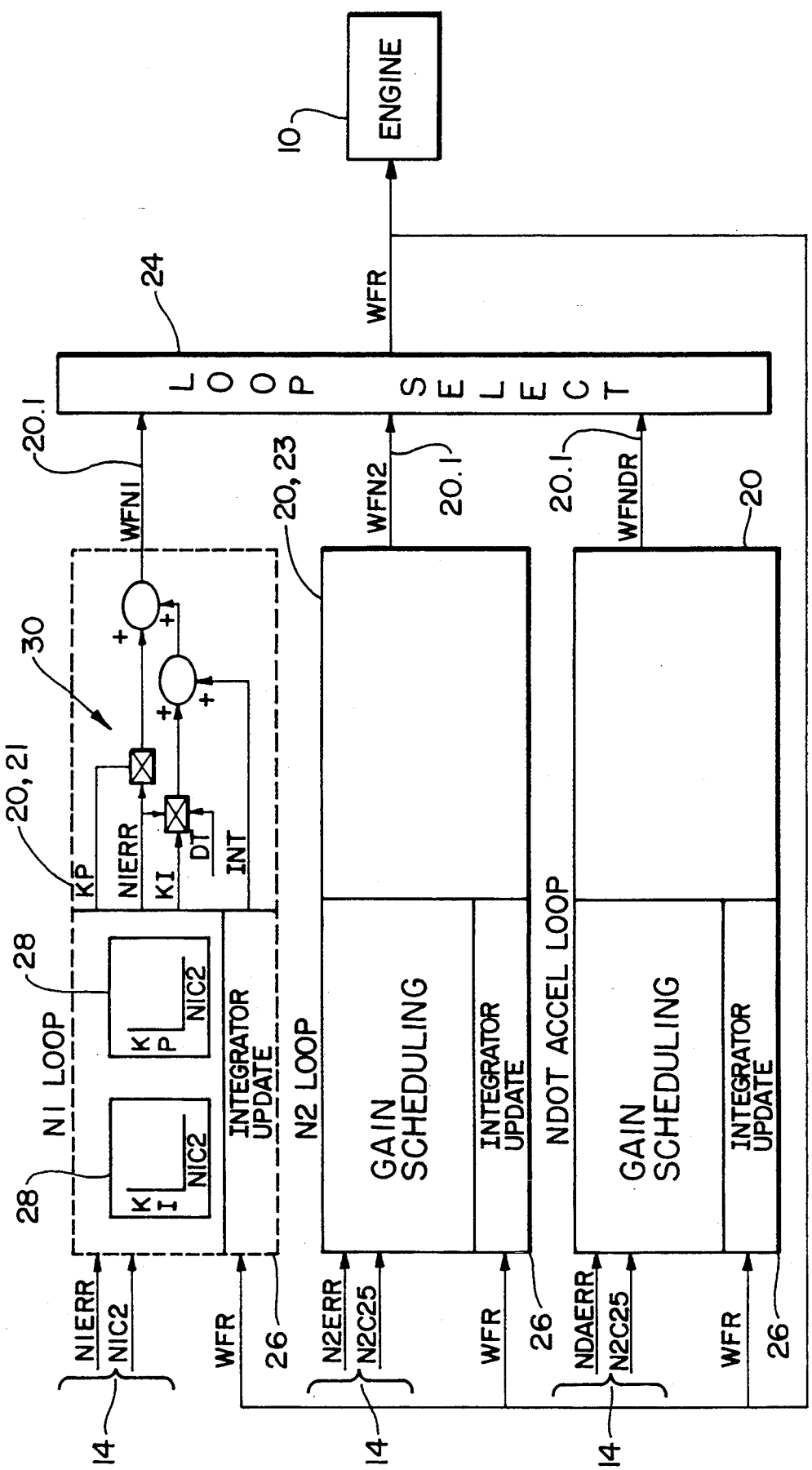
FIG. 2 is a simplified logic block diagram showing three separate control channels that may be incorporated in the system shown in FIG. 1.

FIG. 2, however, illustrates the difference in the presence invention in the form of software blocks. There, for the sake of discussion, three channels or loops 20 are shown. Each has a proportion-integral transfer function (performed digitally by the CPU in FIG. 1) to produce a fuel flow signal, e.g WFN1 for the loop 21, which uses an error signal N1ERR for N1 a corrected value for N1, N1C2 and a fuel flow signal WFR ("WF return"), which indicates the value of fuel flow. WFR is supplied to each of the other loops 20, which receive different engine operating parameters to produce individual fuel flow command values simultaneously with WFN1. For instance, the N2 loop 23 produces WFN2 based on an N2ERR signal. N1ERR, N2ERR and NDAERR are error signals manifesting the difference between actual N1, N2 and acceleration rate and a commanded value for those conditions.

The select block 24 is employed to select or switch between any one of the loops and is functionally analogous to the loop switch step PA1 discussed before. Each loop 20 includes an integrator update function 26, which will be discussed additionally using the flow chart of FIG. 4. Fundamentally, the operation of each integrator update is ensure that the signal levels on each line 20.1 is the same when a loop select is made, something accomplished according the invention by recomputing the values of the error signals, such as N1ERR, so that the output on a monselected line 20.1 equals the value on the selected line 20.1. Though they do not form part of the invention, representative transfer functions 28 for computing a corrected parameter, in this case N1C2 are shown for the N1 loop 21. Likewise, the reference numeral 30 denotes the proportional-integral function. Each loop 20 has these components but scaled and modified, of course, for the particular engine parameter that it uses.

Figure 4:
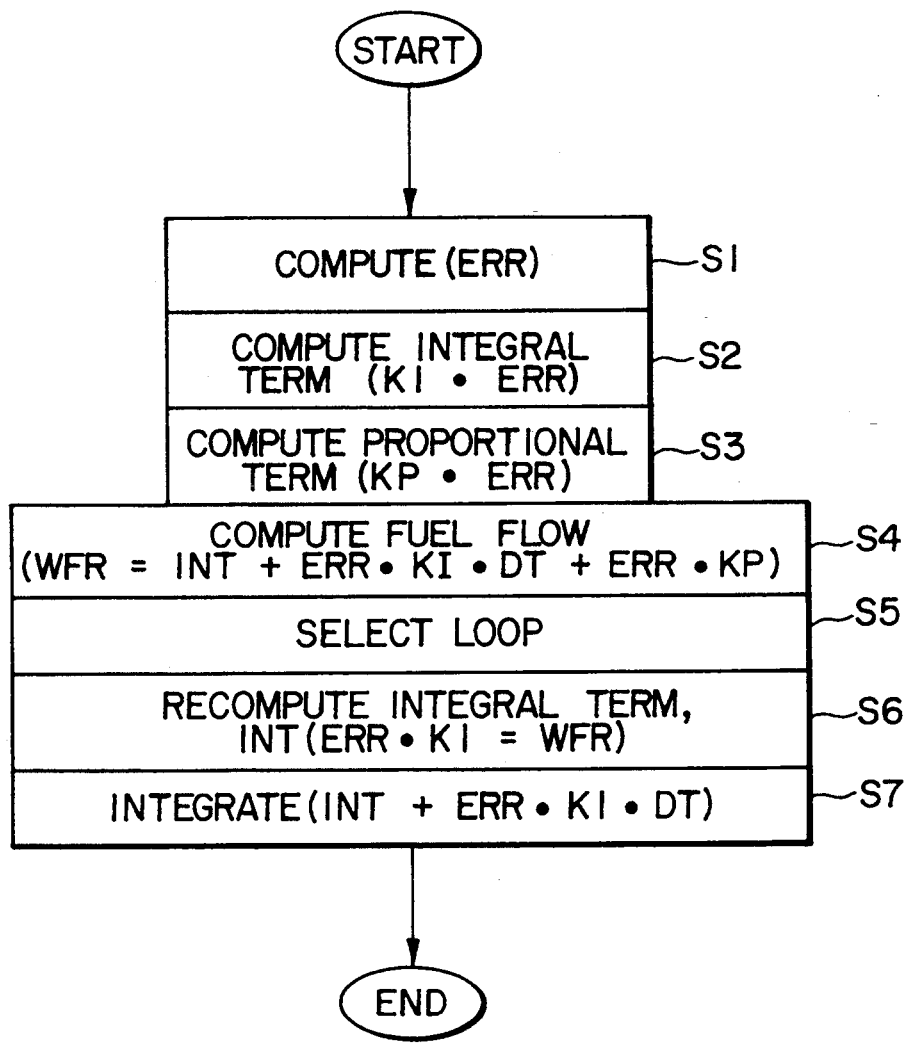
FIG. 4 is also a flow chart like FIG. 3, but shows the steps carried out according to the present invention.

The CPU in FIG. 1 is programmed to carry out the functions shown in FIG. 2, and FIG. 4 is provided here simply to illustrate the sequences that should be covered in programming the CPU to perform the additional function of integrator update (block 26 in FIG. 2) for each loop. At step S1, the CPU computes the error for the block, for instance N1ERR, from the actual and commanded level. Using that and WFR, it computes the integral portion of equation (1) at step S2 and the proportional portion at step S3. At step S4 in sums the values obtained in steps S2 and S3 to provide the fuel flow signal, e.g. WFN1. This is done for each loop 20 at time t=0. Then one of the loops is selected (step S5) at t=+1, producing a value for WF that is used in steps S6 to calculate the error signal for the other loops that would produce that value. Step S7 commands the integration for each loop to begin starting with the computed error signal. For example, if the select loop selects WFN1 at t+1, N2ERR and NDAERR are recalculated so that WFN2 and WFNDR equal WFN1.

In addition to any described or suggested previously, modifications and variations to the invention may be made by one skilled in the art using the above discussion without departing from the true scope and spirit of the invention.

I claim:

1. A control system comprising a signal processor providing first and second proportional-integral control functions to produce individual control signals based on an actual error signal and means for selecting one of the individual control signals at a first time, characterized in that:

the first and second proportional-integral functions each includes computing the value of a computed error signal to produce the one control signal if the proportional-integral function is not selected at the first time, and for integrating the computed error signal instead of an actual error signal commencing at said first time.

2. A control system responsive to a plurality of actual error signals to produce a control signal from one of a plurality of channel signals, each produced by an individual proportional-integral control based on one of the actual error signals and the control signal, characterized by:

signal processing means comprising means for providing first and second proportional-integral functions to produce said channel signals, for selecting one of the channel signals at a first time to produce the control signal, for computing the value of a computed error signal to produce the control signal if the proportional-integral function is not selected at the first time, and for integrating the computed error signal instead of the actual error signal commencing at said first time.

3. A method for producing a control signal that controls an engine characterized by the steps:

producing a control signal from one of a plurality of channel signals, each produced by an individual proportional-integral control based on one of the error signals and the control signal;

providing first and second proportional-integral functions to produce said channel signals;

selecting one of the channel signals at a first time to produce the control signal;

computing the value of a computed error signal to produce the control signal if the proportional-integral function is not selected at the first time; and integrating the computed error signal instead of an actual error signal commencing at said first time.

* * * * *